(12) United States Patent
Gable (10) Patent No.: US 6,199,883 B1
(45) Date of Patent: Mar. 13, 2001

(54) ARTICULATED REAR FENDER FOR BICYCLES

(76) Inventor: Jack C. Gable, 577 Clement Avenue, Kelowna, British Columbia (CA), V1Y 7C7

( * ) Notice: Subject to any disclaimer, the term of this patent is extended or adjusted under 35 U.S.C. 154(b) by 0 days.

(21) Appl. No.: 09/605,365

(22) Filed: Jun. 29, 2000

(51) Int. Cl.$^7$ .................................................. B62D 25/18
(52) U.S. Cl. .................................... 280/152.1; 280/152.3; 280/852
(58) Field of Search ..................................... 280/847, 848, 280/852, 158.1, 160.1, 152.1, 152.3; 403/97; D12/114; 224/412, 414

(56) References Cited

U.S. PATENT DOCUMENTS

| | | | |
|---|---|---|---|
| 5,868,411 | * | 2/1999 | Dymeck ................................ 280/852 |
| 5,954,354 | * | 9/1999 | Chang ................................... 280/852 |
| 5,961,136 | * | 10/1999 | Tseng ................................. 280/152.1 |

FOREIGN PATENT DOCUMENTS

| | | | |
|---|---|---|---|
| 2610278 | * | 8/1988 | (FR) ...................................... 280/852 |
| 002690125 | * | 10/1993 | (FR) ...................................... 280/852 |

* cited by examiner

*Primary Examiner*—Richard M. Camby
(74) *Attorney, Agent, or Firm*—Anthony C. Edwards

(57) ABSTRACT

An articulated rear fender for a bicycle includes a clamp releasably mountable to a seat post and a fender body mounted to the clamp.

9 Claims, 9 Drawing Sheets

ARTICULATED REAR FENDER FOR BICYCLES

FIELD OF THE INVENTION

This invention relates to a fender, which can be removably mounted to the generally vertically disposed seat post of a bicycle and aligned over the rear wheel. Further, it relates to a bike fender which can be selectively articulated, by the cyclist, in a generally vertical plane over the rear wheel of a bicycle incorporating pneumatic dampening devices in the rear forks and which devices tend to substantially increase the travel of the forks relative to the wheel of the bicycle. Such increased fork travel generally makes a fixed fender over the rear wheel impracticable.

BACKGROUND OF THE INVENTION

The use of the rugged style bicycles generally referred to as mountain bikes is a popular means of travel on roadways as well as a means of recreation in off-road situations. Due to the need to minimize both the bicycle weight and the frequent damage which occurs when the bicycle is ridden over rough off-road terrain, the rear fender has been found to be impracticable. The elimination of the rear fender, however, results in the material which adheres to the surface of the rear tire being spun off the tire in the direction of the rider as the wheel rotates past the vertical apex of travel.

In some instances removal of the fender is undertaken prior to off-road use in order to protect the rear fender against accidental damage. Due to the time required for the removal of the fender and the fact that such off-road recreational use may occur on the 'spur-of the moment' such consideration is impracticable.

On extreme terrain bikes, that is, those bikes incorporate pneumatic dampening devices in the rear forks, and in particular so-called "down-hill" bikes, a fixed fender over the rear wheel is often impracticable since the substantially increased travel of the forks and frame relative to the rear wheel would cause the wheel and fender to make contact.

It is, therefore, an object of the present invention to construct a rugged, light weight fender for bicycles which is cantilevered from the seat post and will bear the weight of a small load such as pannier or saddle bags mounted on the fender.

Further, it is an object of the present invention to provide a rugged, light weight fender for bicycles, which can be easily attached to or detached from the seat post of the bicycle and quickly aligned over the rear wheel, thereby preventing the back of the rider from becoming splattered as material adhering to the surface of the rear tire is spun off the tire in the direction of the rider as the wheel rotates past the vertical apex of travel.

A further object of the present invention is to provide a fender for bicycles of the type which incorporate pneumatic dampening devices in their rear forks, where such a fender can be articulated in a general vertical plane over the rear wheel to thereby increase clearance between fender and bicycle wheel so as to accommodate the exaggerated relative fork and frame travel associated with these types of bicycles.

SUMMARY OF THE INVENTION

The present invention is a bicycle fender that can be removably attached to the seat post of a bicycle so that the fender will extend rearwardly therefrom above the rear wheel of the bicycle.

The fender is attached to the bicycle seat by a clamp, which comprising an elongated body portion having separate complimentary clamping halves. These clamping halves are adjustable in an adjacent or in a spaced apart parallel position so as to clamp around a seat post. The halves are tightened about the post by a bolt or the like. Each of the clamping halves has at one end a first smooth cylindrical recess for frictionally engaging the bicycle seat post. A second cylindrical recess is formed at the opposite end of each half, disposed generally at right angles to the first recesses. Each second cylindrical recess is crenellated or otherwise lined with parallel teeth, splines or serrations (collectively referred to as serrations, splines or teeth) formed around the internal surface thereof.

A separate fender body has a forward portion of relatively short dimension and an elongated tail portion. The forward portion of the fender is angularly disposed relative to the tail portion in a flattened V-shape or chevron-shape such that when the clamp is mounted to the seat post, and the fender is mounted to the clamp, the tail portion is elevated above a rear wheel of the bicycle.

In summary, the articulated rear fender for a bicycle of the present invention includes a clamp releasably mountable to a seat post of the bicycle and a fender body mounted or mountable to the clamp. The clamp has opposed facing first and second halves releasably tightenable by a releasable tightener into opposed facing cooperation. A semicircular first recess in a first end of the first half cooperates, so as to match, a semicircular first recess in a first end of the second half. The first and second halves form a cylindrical collar mountable around the seat post. A generally cylindrical second recess in an opposite second end of the first half matches a generally cylindrical second recess in an opposite second end of the second half when the halves are mounted in opposed facing relation. The second recesses form a cylindrical receiving cavity having a longitudinal axis perpendicular to a longitudinal axis of the seat post.

Each second recess has splines formed in and around the walls of the recesses. The splines are parallel to the longitudinal axis of the receiving cavity. Each second recess has a notch in its wall which opens from the second recess outwardly from the second end of each of the first and second halves. The notches form a receiving aperture into the receiving cavity when the second recesses are in the opposed facing relation.

A cylindrical member is cantilevered on a rigid arm from a first end of the fender body. The cylindrical member has teeth around the cylindrical member for releasably lockable mating of the teeth with the splines when the cylindrical member is mated into the receiving cavity and the arm is journalled through the receiving aperture.

The fender body is elongate and non-planar along its length so that a first portion of the fender body closest to the arm extends from the arm and angles downwardly relative to a line perpendicular to the longitudinal axis of the seat post when the fender body is mounted to the clamp and the clamp mounted to the seat post. A second portion of the fender body is contiguous to the first portion and extends from the first portion angled upwardly relative to the first portion. The first and second portions of the fender body may form an included angle therebetween of 125 degrees.

The fender body is rotatably articulatable in a generally vertical plane between an angularly lowered position and an angularly elevated position about the longitudinal axis of the receiving cavity by selective rotation of the cylindrical member relative to the receiving cavity when mounting the cylindrical member in the receiving cavity.

In one embodiment the releasable tightener is a bolt extending through the first and second halves. Advantageously the splines and the teeth are crenellated. Further advantageously, the receiving aperture is elongate in the plane so as to allow a range of articulated motion of the fender body relative to the clamp.

In one aspect of the present invention the cylindrical member is selectively positionable relative to the receiving cavity only by the first and second halves being translated apart from one another so as to remove the cylindrical member from the second recesses. The cylindrical member is then rotated to a new angular position and the cylindrical member re-encased within the receiving cavity by translation of the first and second halves into opposed facing adjacency. The first and second halves are then tightened toward each other to clamp the seat post and to clamp the second recesses onto the cylindrical member.

In a second aspect, cylindrical member comprises an outer shear sleeve mounted onto a base. The shear sleeve may slidably mount onto the base along slides parallel to the longitudinal axis of the receiving cavity when the cylindrical member is mounted into the receiving cavity.

DETAILED DESCRIPTION OF PREFERRED EMBODIMENTS

As seen in the accompanying figures, the articulated rear fender 10 of the present invention is removably mountable to the seat post 12 of a bicycle (not shown). The fender 10 generally comprises a clamp 14 and an elongated fender body 16. Clamp 14 is formed in two complimentary mirror-image halves 18 which can be readily adjusted relative to each other by means of clamping bolt 20. bolt 20 may be releasably tightened by hand, for example by means of over-center latch 20a. A smooth cylindrical recess 24 is formed near one end of clamp 14. Recess 24 is placed in coaxial alignment against the seat post 12. A second cylindrical recess 26, generally at right angles to recess 24, is formed near the opposite end of clamp 14. Recess 26 has a plurality of longitudinal teeth or crenellated teeth, splines or serrations 28 formed radially around its surface.

Fender body 16 has a forward portion 16a of relatively short dimension and an elongated tail portion 16b. Forward portion 16a is angularly disposed relative to tail portion 16b such that the included angle between these portions, as measured on their respective upper surfaces 34, is generally 125 degrees although this is not intended to be limiting.

Forward portion 16a is smoothly reduced in cross sectional width to so as to taper towards, and terminate in, a connector arm 36. Arm 36 has a serrated cylindrical male locking member 38 formed at its distal tapered end. Serrations teeth, crenellated teeth 29 or the like are formed on member 38 so as to correspond to matching serrations 28 on recesses 26. Serrations 28 and 29 releasably mate and interlock for positive lockable mounting of fender 16 to seat post 12.

Arm 36 passes through opposed facing notches 44 in opposed facing recesses 26 when halves 18 are mated to form clamp 14. Notch 44 is sized to allow rotational articulation between clamp 14 and fender body. By selectively positioning member 38 within second cylindrical recesses 26, fender body 16 may be selectively articulated in direction A in a vertical plane, above the rear wheel of the bicycle (not shown).

In operation, the clamping bolt 20 is slackened sufficiently to permit the two halves 18 of clamp 14 to be spaced apart and positioned on either side of bicycle seat post 12. Cylindrical recesses 24 are then placed over, in coaxial alignment with, seat post 12. While the clamping halves 18 are still loose, the preferred angle for fender body 16 relative to the seat post is selected by the rider. Tightening clamping bolt 20 draws halves 18 tightly together whereby both clamp 14 and fender body 16 are held in their desired position relative to each other and relative seat post 12.

Figure 1:
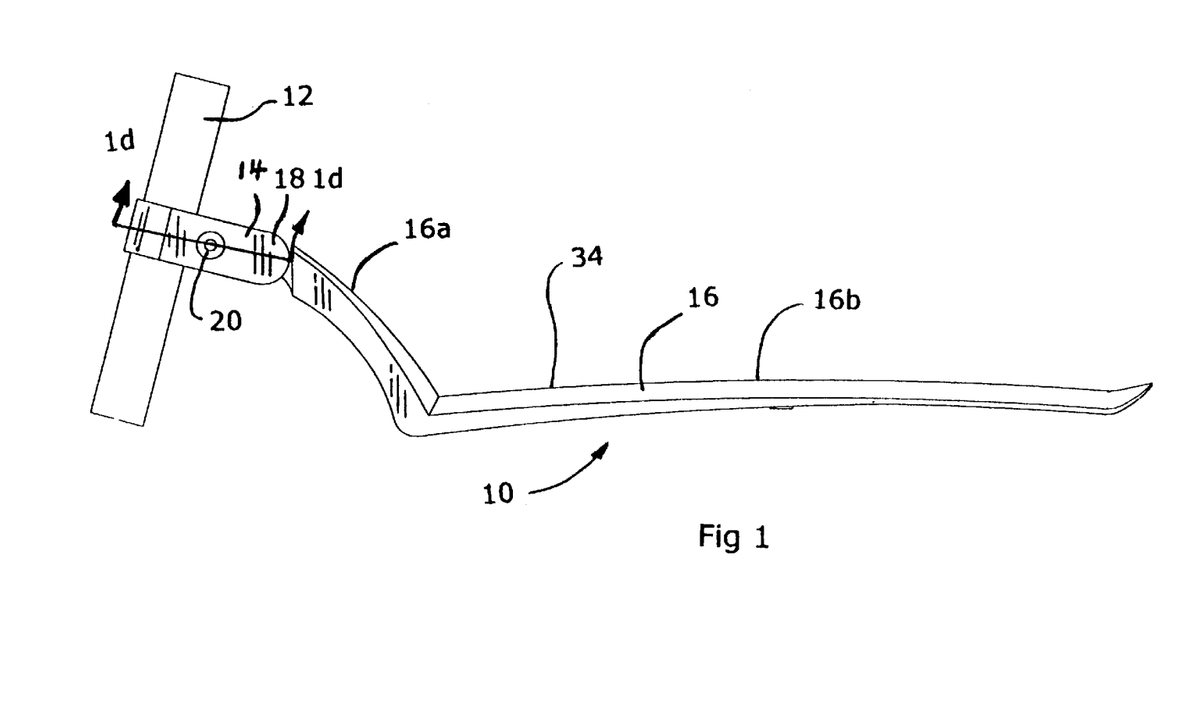
FIG. 1, is a side elevation of the bicycle fender of the present invention to a seat post.
Figures 1A, 1C:
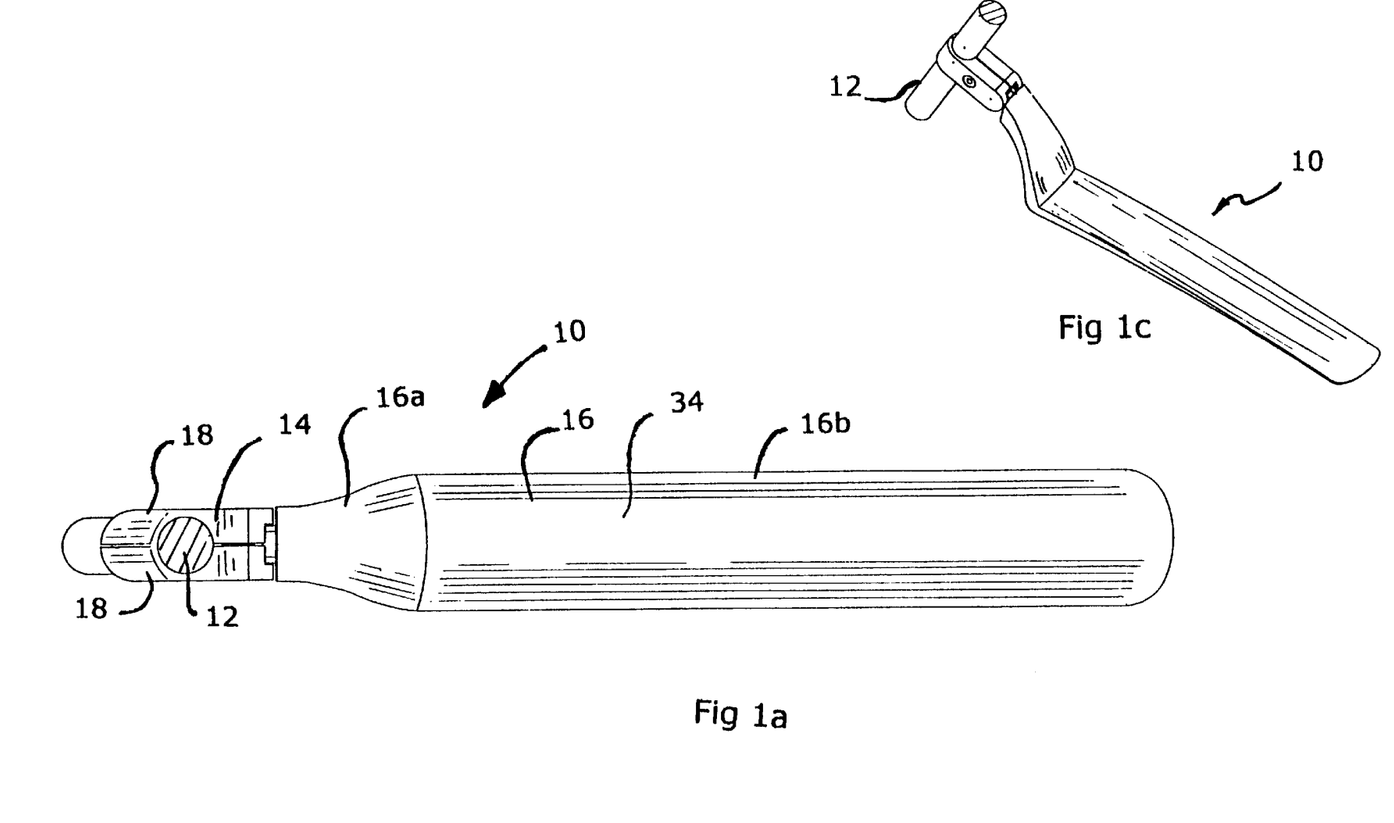
FIG. 1a is a plan view of the bicycle fender of FIG. 1.
FIG. 1c is a perspective view of the bicycle fender of FIG. 1.
Figure 1B:
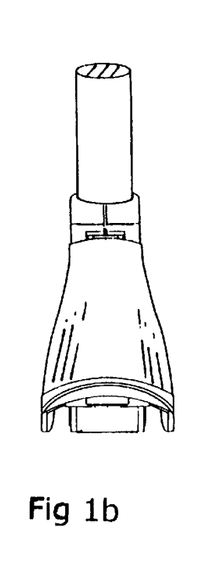
FIG. 1b is an end elevation view of the bicycle fender of FIG. 1.
Figure 1D:
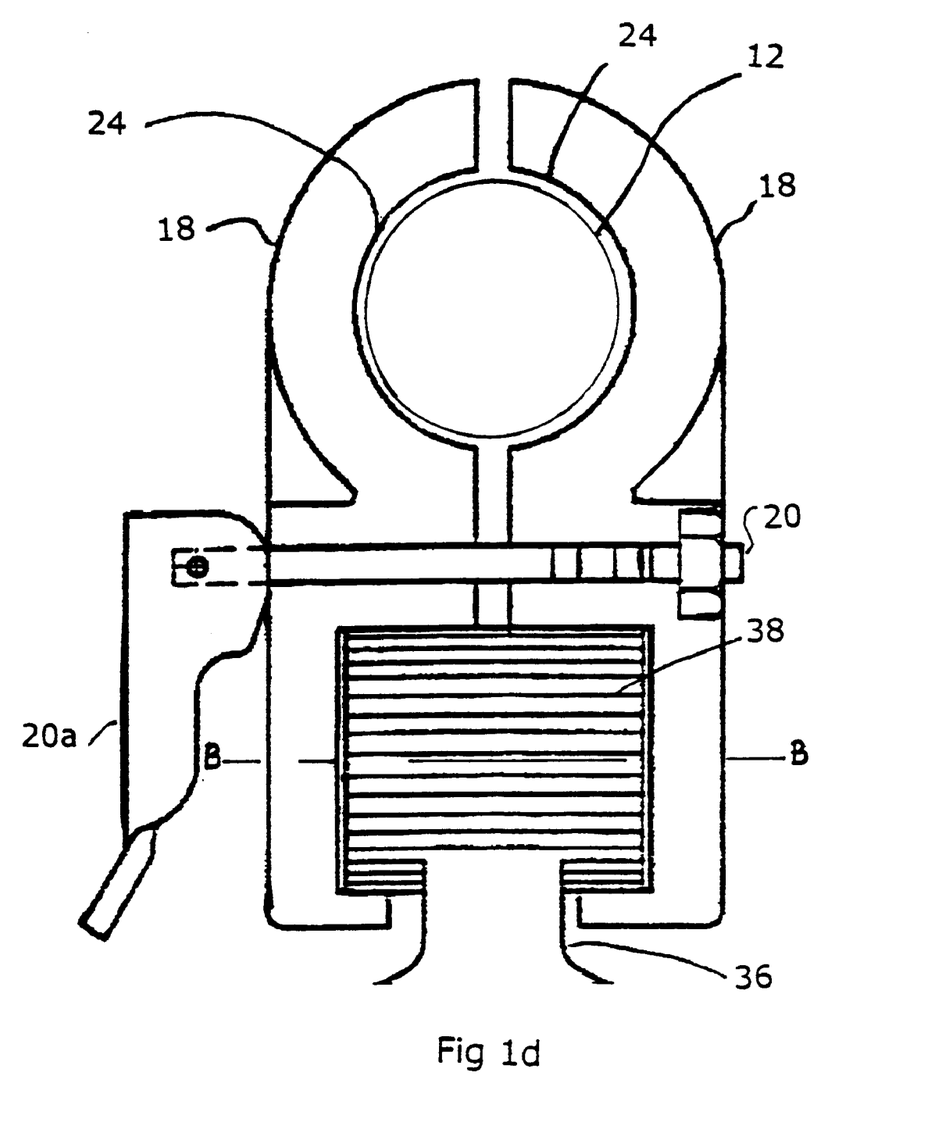
FIG. 1d is a sectional view along line 1d—1d in FIG. 1 with a shearing sleeve mounted on the fender body.
Figure 2:
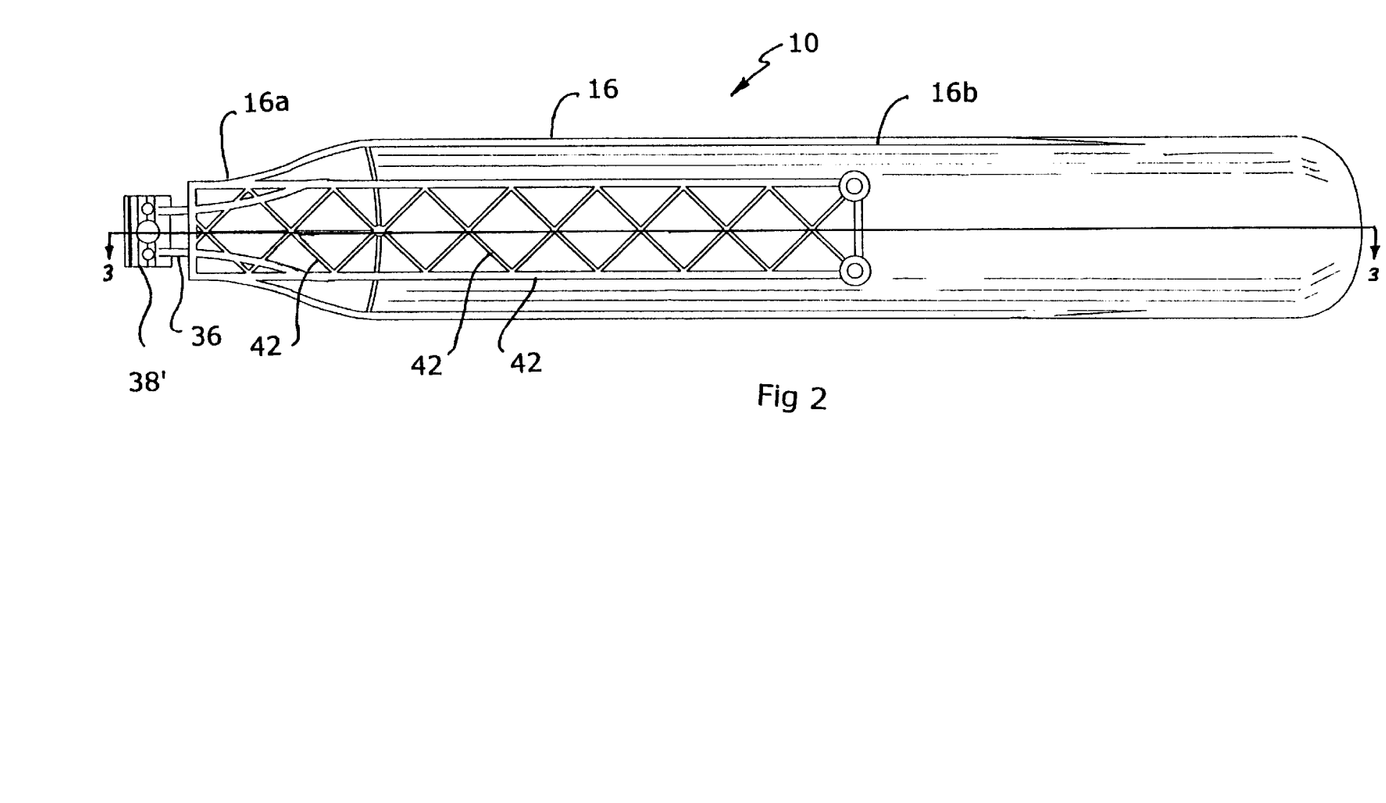
FIG. 2 is an underside view of the fender body of the bicycle fender of the present invention.
Figure 3:
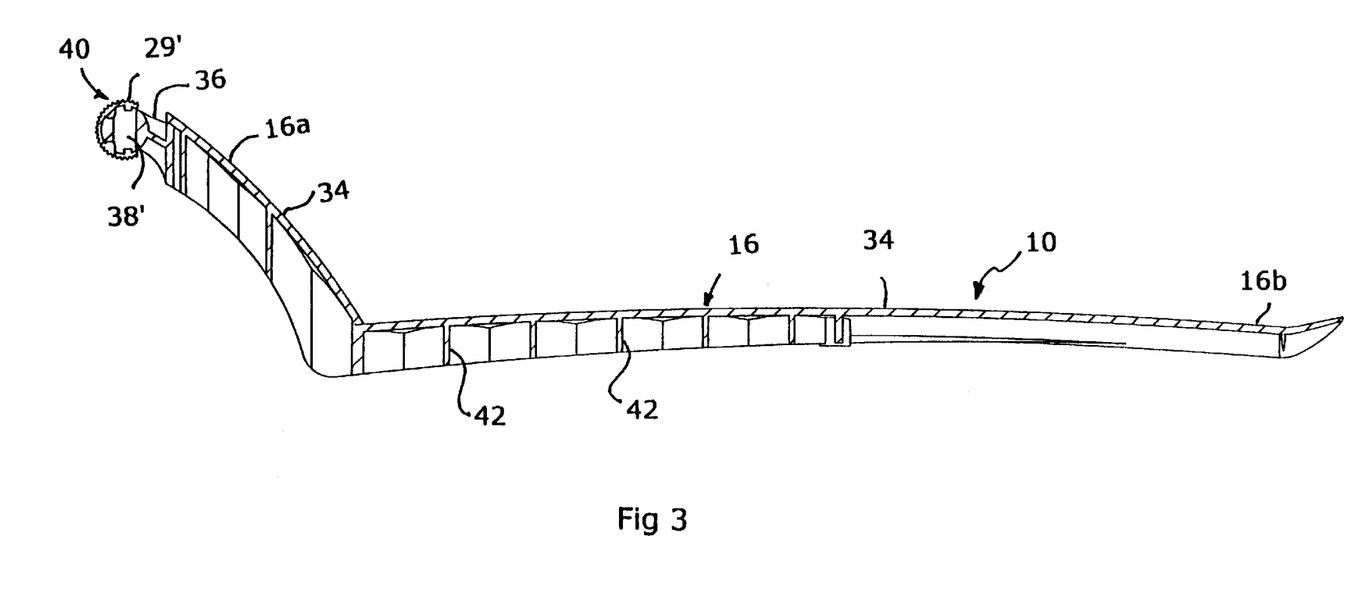
FIG. 3 is an enlarged side view of the fender body portion.
Figures 4, 4A:
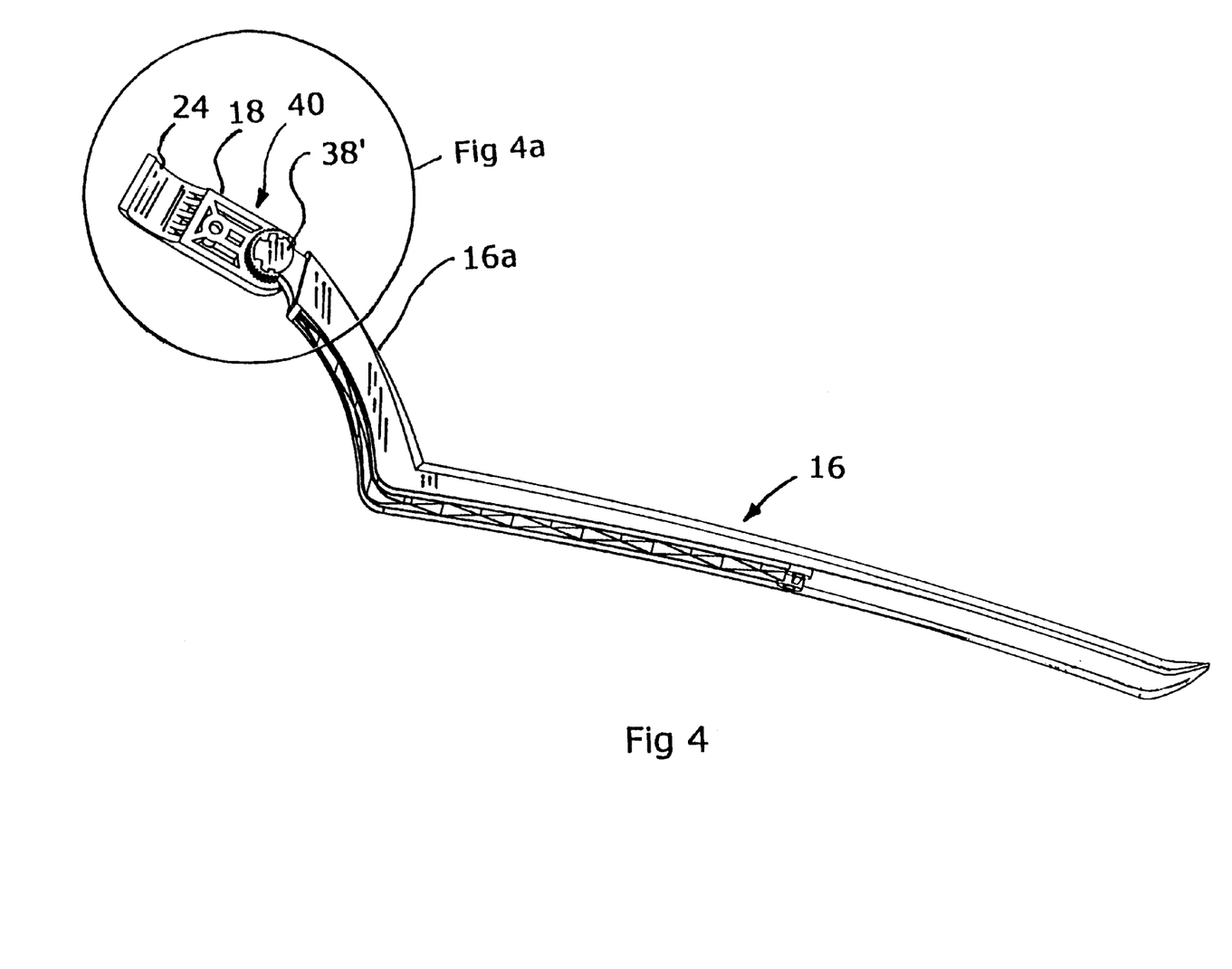
FIG. 4 is a perspective view of one half of the clamp and the fender body.
FIG. 4a is an enlarged view of the clamp of FIG. 4.
Figure 4A:
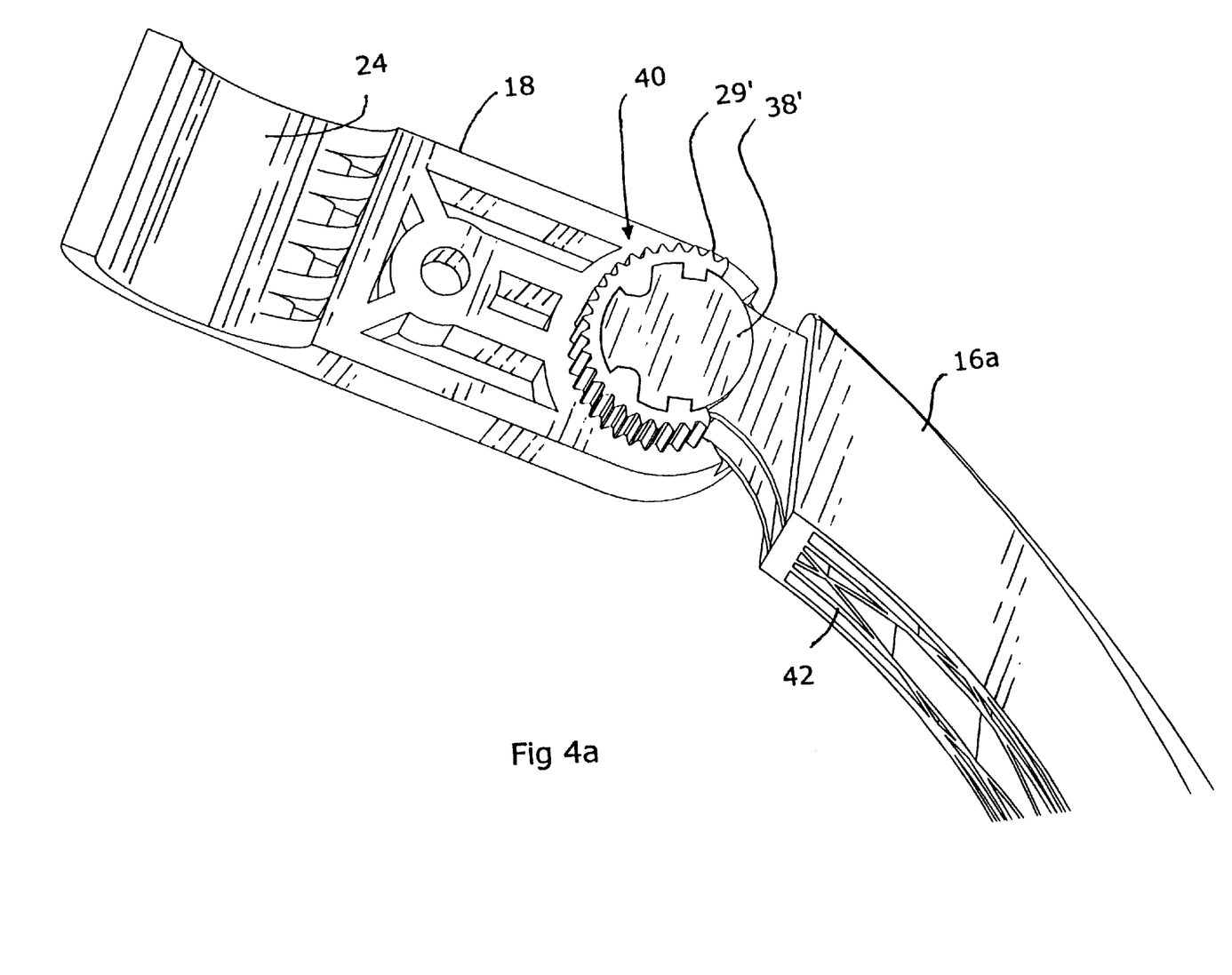
Figure 5:
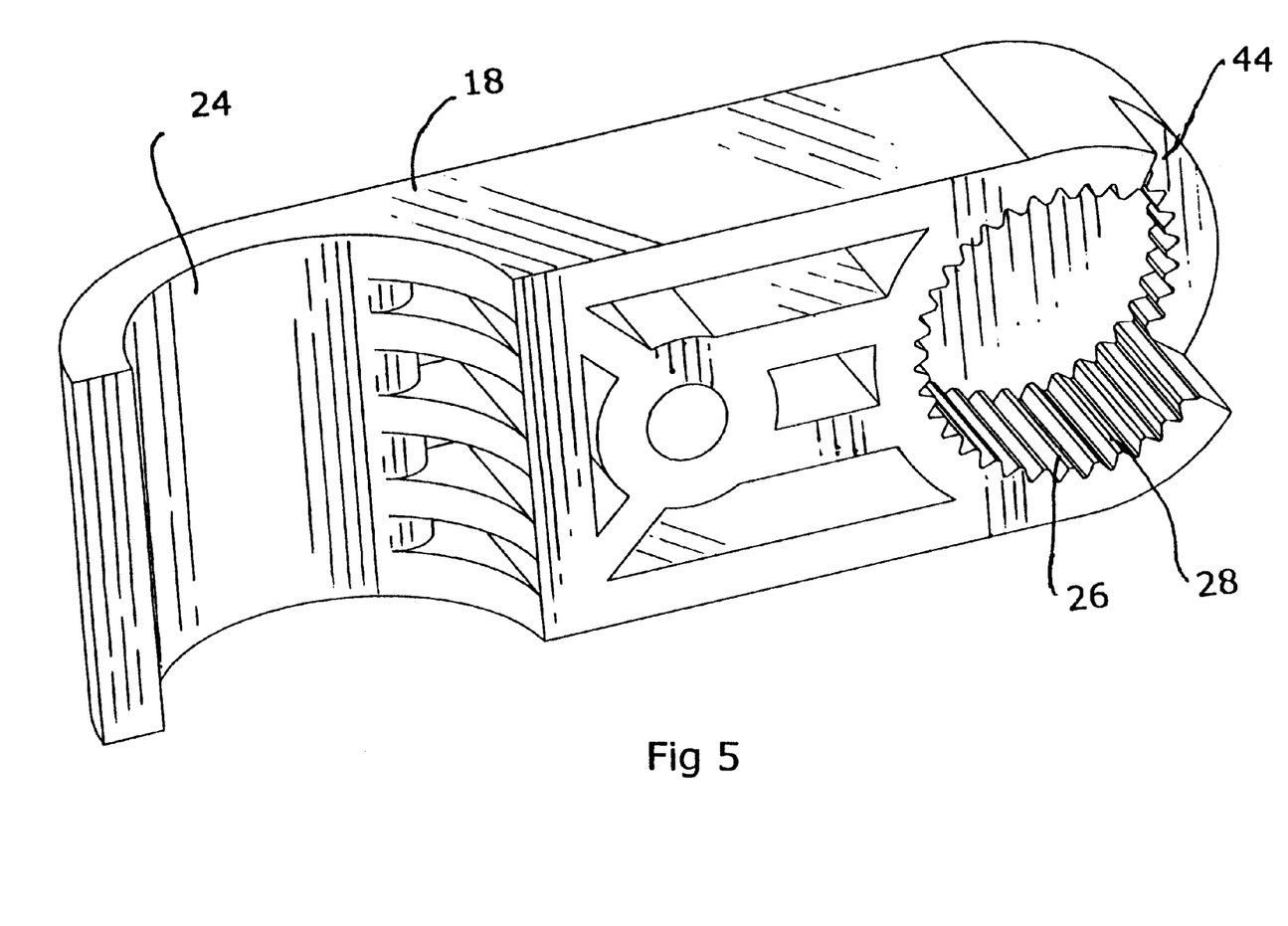
FIG. 5 is an enlarged perspective view of one half of the clamp.
Figure 6:
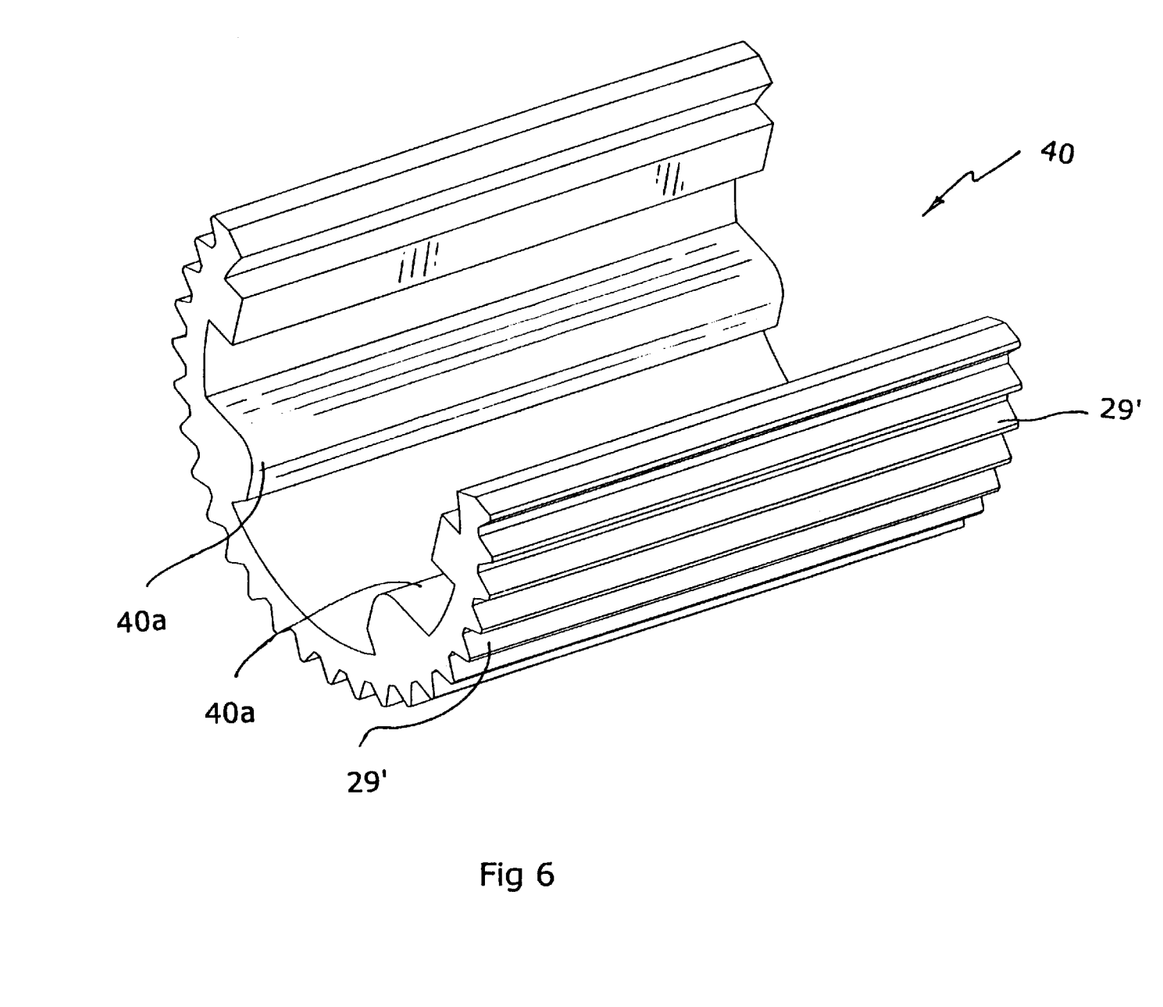
FIG. 6 is an enlarged perspective view of the shear sleeve.

In an alternative embodiment, member 38 is formed without serrations 38. Instead, serrations 29' are formed on a separate shear sleeve 40 as can be seen in FIGS. 3 and 6. Sleeve 40 is slidably mounted on to member 38. Flanges 40a are formed internally on the sleeve. The flanges frictionally engage corresponding channels formed externally on the cylindrical member 38' when the flanges are slid onto the channels. Shear sleeve 40 may be designed to shear under high impact stresses. For example sleeve 40 may be made of thermoplastics such as polyphenelene oxide or polyphenelene sulphide to provide high IZOD impact test numbers or may be engineered of lesser strength material than the higher strength material of clamp 14 and fender 16 so as to shear prior to damage to either the clamp or fender. Additional stiffening ribs 42 as may be required can be provided on the underside of the fender body.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An articulated rear fender for a bicycle comprising:
   a clamp releasably mountable to a seat post of said bicycle,
   a fender body mountable to said clamp,
   said clamp having opposed facing first and second halves releasably tightenable by a releasable tightener into opposed facing cooperation so that a semicircular first recess in a first end of said first half matches a semicircular first recess in a first end of said second half so as to form a cylindrical collar mountable around said seat post, and so that a generally cylindrical second recess in an opposite second end of said first half matches a generally cylindrical second recess in an opposite second end of said second half,
   said second recesses when mounted in said opposed facing relation forming a cylindrical receiving cavity having a longitudinal axis perpendicular to a longitudinal axis of said seat post, each said second recess having splines formed in a wall thereof, said splines parallel to said longitudinal axis of said receiving cavity, each said second recess having a notch in its wall, said notch opening from said second recess outwardly from said second end of each said first and second halves, said notches forming a receiving aperture into said receiving cavity when said second recesses are in said opposed facing relation, said fender body having mounted at a first end a cylindrical member cantilevered on a rigid arm from said fender body, said cylindrical member having teeth around said cylindrical member for releasably lockable mating of said teeth with said splines when said cylindrical member is mated into said receiving cavity and said arm is journalled through said receiving aperture, said fender body elongate and non-planar along its length so that a first portion of said fender body closest to said arm extends from said arm and angles downwardly relative to a line perpendicular to said longitudinal axis of said seat post when said fender body is mounted to said clamp and said clamp mounted to said seat post, and wherein a second portion of said fender body contiguous to said first portion extends from said first portion and is angled upwardly relative to said first portion, wherein said fender body is rotatably articulatable in a generally vertical plane between an angularly lowered position and an angularly elevated position about said longitudinal axis of said receiving cavity by selective rotation of said cylindrical member relative to said receiving cavity when mounting said cylindrical member in said receiving cavity.

2. The device of claim 1 wherein said releasable tightener is a bolt extending through said first and second halves.

3. The device of claim 1 wherein said splines and said teeth are crenellated.

4. The device of claim 1 wherein said receiving aperture is elongate in said plane so as to allow a range of articulated motion of said fender body relative to said clamp.

5. The device of claim 4 wherein said cylindrical member is selectively positionable relative to said receiving cavity only by said first and second halves being translated apart from one another so as to remove said cylindrical member from said second recesses, said cylindrical member being rotated to a new position and then said cylindrical member re-encased within said receiving cavity by translation of said first and second halves into opposed facing adjacency.

6. The device of claim 1 wherein said cylindrical member comprises an outer shear sleeve mounted onto a base.

7. The device of claim 1 wherein said shear sleeve slidably mounts onto said base along slides parallel to said longitudinal axis of said receiving cavity when said cylindrical member is mounted into said receiving cavity.

8. The device of claim 1 wherein said first and second portions of said fender body form an included angle therebetween of 125 degrees in said plane.

9. The device of claim 2 wherein said bolt is between said first and second recesses.

* * * * *